United States Patent [19]

Mathison et al.

[11] Patent Number: 5,353,841
[45] Date of Patent: Oct. 11, 1994

[54] PNEUMATIC PLUG FOR CLEAN-OUT TEES

[75] Inventors: Allen D. Mathison, Richfield; Marc P. Bevacco, New Hope; Bryan R. Benson, North Branch, all of Minn.

[73] Assignee: Cherne Industries Incorporated, Minneapolis, Minn.

[21] Appl. No.: 64,378

[22] Filed: May 21, 1993

[51] Int. Cl.5 ............................................. F16L 55/124
[52] U.S. Cl. ........................................ 138/93; 138/94; 138/90
[58] Field of Search ................. 138/89, 90, 89.3, 93, 138/94; 285/144, 147, 148

[56] References Cited

U.S. PATENT DOCUMENTS

| | | | |
|---|---|---|---|
| 922,544 | 5/1909 | Turner et al. | 138/90 |
| 1,808,411 | 6/1931 | Hinkston | 138/90 |
| 2,285,779 | 6/1942 | Mueller et al. | 138/94 |
| 2,811,985 | 11/1957 | Wells | 138/93 |
| 2,878,834 | 3/1959 | Mercier | 138/89 |
| 3,409,035 | 11/1968 | Miller | 138/94 |
| 3,805,844 | 4/1974 | Bacon | 138/94 |
| 4,122,869 | 10/1978 | Roberson | 138/94 |
| 4,203,473 | 5/1980 | Roberson . | |
| 4,349,047 | 9/1982 | Ditto et al. | 138/89 |
| 4,369,813 | 1/1983 | Thomas | 138/89 |
| 4,417,598 | 11/1983 | De Pirro . | |
| 4,458,721 | 7/1984 | Yie et al. . | |
| 4,467,836 | 8/1984 | Ragout . | |
| 4,506,706 | 3/1985 | Sandmann . | |
| 4,614,206 | 9/1986 | Mathison et al. . | |
| 4,658,861 | 4/1987 | Roberson . | |
| 4,719,687 | 1/1988 | Nanny | 138/93 |

Primary Examiner—David A. Scherbel
Assistant Examiner—James F. Hook
Attorney, Agent, or Firm—Anthony G. Eggink

[57] ABSTRACT

A pneumatic test plug for clean-out tees having an elastomeric inflatable body, a closed top, an inwardly tapered side wall and an open bottom end with a peripheral shoulder having a downwardly extending peripheral ridge. A molded end cap with a cylindrical wall having exteriorly disposed threads and an inwardly disposed circular retention channel or area receives a retention collar for placement within the molded end cap and between the cylindrical wall and the inflatable body bottom end. The retention collar fixes the peripheral shoulder and downwardly extending peripheral ridge in the circular retention channel or area of the end cap and compressingly holds the peripheral shoulder of the inflatable body into the end cap.

19 Claims, 5 Drawing Sheets

PNEUMATIC PLUG FOR CLEAN-OUT TEES

BACKGROUND OF THE INVENTION

This invention relates generally to pneumatic plug devices for sealing pipelines or conduits. Particularly, this invention relates to pneumatic test plugs for sealing clean-out tees or access ports of low pressure pipelines or conduits.

Clean-out tees or access ports to pipelines are typically found in drain pipes, such as those located in the main plumbing drain pipes in residential structures. Clean-out tees are also utilized in other horizontally and vertically disposed conduits or pipelines which may require periodic entry for cleaning or inspection purposes. The clean-out tees or access ports are typically circular structures which extend perpendicularly from the pipeline and are internally threaded to receive a threaded closure cap.

The pneumatic clean-out plug device of this invention permits a user to utilize a clean-out tee or access port and to seal the pipeline for purposes of testing the pipeline for leakage, pressure testing, or the like. The pneumatic test plug of the invention is designed to use the internal threads of the clean-out tee for securement purposes.

Although various plugs, including pneumatic plugs, have been used and proposed in the past for sealing clean-out tees, they have typically been complex structures which have been difficult and costly to manufacture. For example, U.S. Pat. No. 4,658,861 to Roberson discloses a test plug assembly for pressure testing fluid drains and vent systems. The '861 plug assembly utilizes an inflatable body and a rigid holder portion which are united by means of a valve stem. The configuration of the '861 assembly is difficult and expensive to manufacture. The materials required to properly unite the inflatable body to the rigid holder portion requires a relatively harder elastomeric material which may compromise proper sealing of the plug assembly in certain conduit structures.

The pneumatic test plugs for clean-out tees according to the teachings of this invention overcome the difficulties, limitations and other shortcomings of these prior art devices.

SUMMARY OF THE INVENTION

This invention provides a pneumatic test plug for clean-out tees. The pneumatic test plug has an elastomeric inflatable body with a closed top, an inwardly tapered side wall and an open bottom end having a peripheral shoulder with a downwardly extending peripheral ridge.

An end cap structure is provided with an upwardly extending cylindrical wall having exteriorly disposed threads and an inwardly disposed circular retention channel or area to receive the inflatable body. A retention collar is placed within the end cap structure and between the cylindrical wall and the inflatable body bottom end to fix the peripheral shoulder and downwardly extending peripheral ridge in the circular retention channel or area of the end cap. The retention collar compresses and fixes the peripheral shoulder and ridge of the inflatable body into the end cap.

The clean-out tee plug assemblies of this invention provide a novel elastomeric body structure which cooperates with the end cap and retention collar embodiments to yield a secure assembly which is easily maneuverable in clean-out tee structures and which provide effective seals in a pipeline. As will be further discussed below, the larger open end of the elastomeric body, for example, lends itself to injection molding and provides for economical assembly methods which yield a pneumatic test plug which has integrity for repeated use. Further, the inflator utilized in the plug assembly is a standard item which may be easily replaced when damaged. Unlike prior art assemblies which utilize the inflator stem for connection purposes and which, therefore, are difficult to service or replace when damaged, the plug assembly of the present invention permits quick and easy maintenance.

These and other benefits of this invention will become clear from the following description by reference to the drawings.

DESCRIPTION OF THE PREFERRED EMBODIMENT

Figure 1:
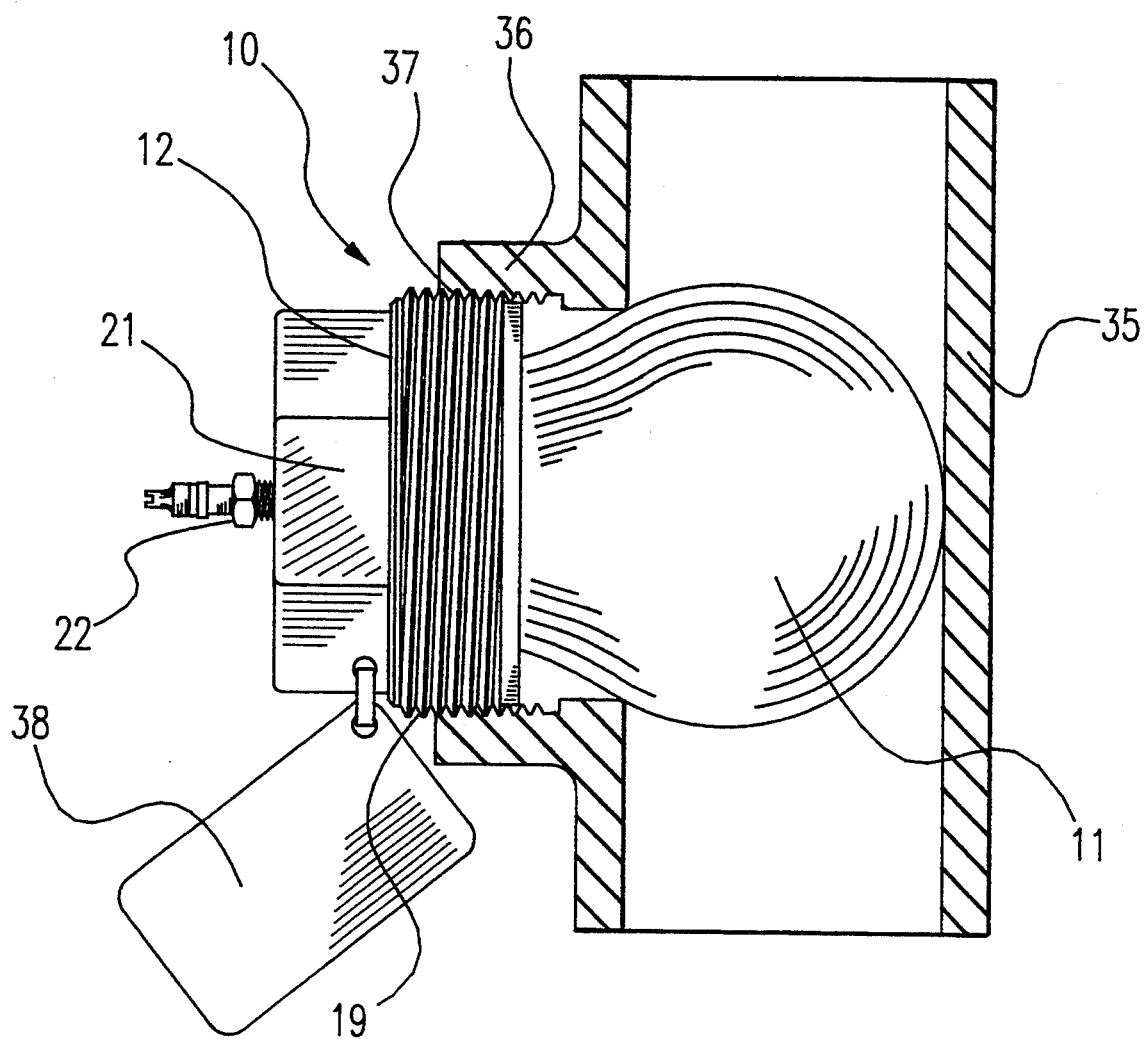
FIG. 1 is a lateral cross-sectional view showing the pneumatic test plug installed in the entry port of a pipeline.
Figure 2:
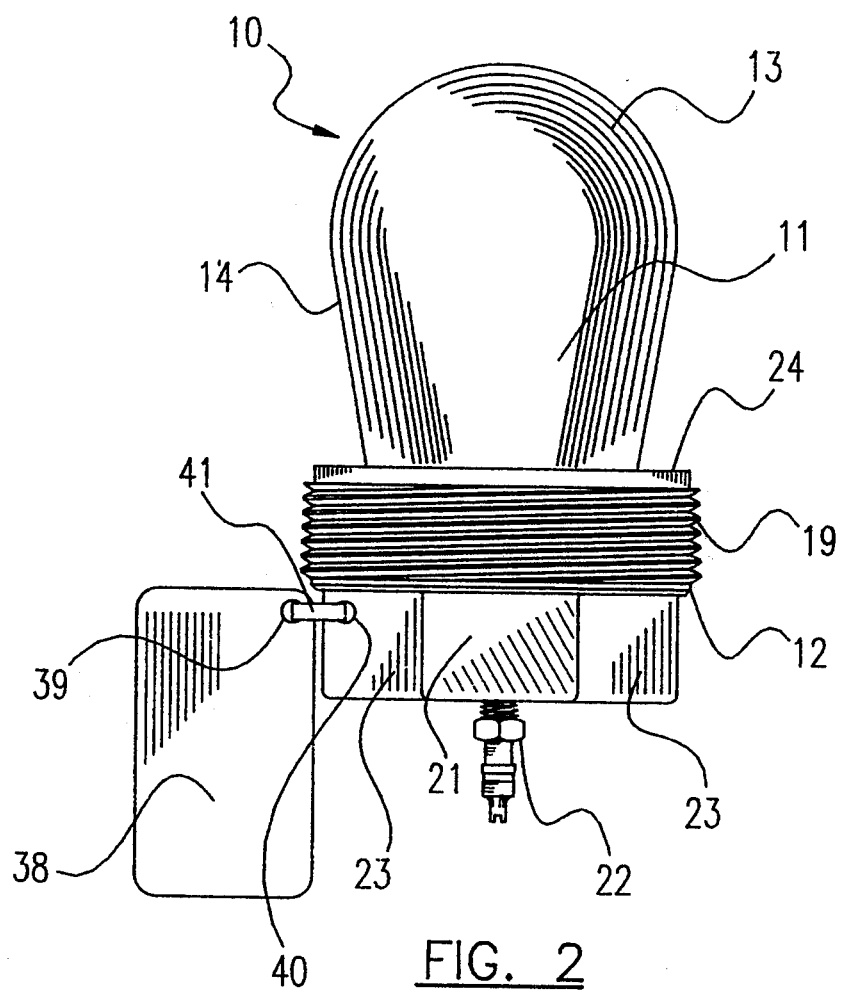
FIG. 2 is a lateral schematic view of the pneumatic test plug of the present invention.

Referring to FIGS. 1 and 2, a typical clean-out tee 36 is shown extending from pipeline 35. The pneumatic test plug 10 is shown positioned in the clean-out tee 36. The clean-out tee or entry port 36 has interiorly disposed threads 37 and which normally receives a threaded closure plug. The pneumatic test plug 10 is secured in the clean-out tee 36 and subsequently inflated with a fluid, such as air or water, to seal pipeline 35 for pressure testing purposes, for example. The pneumatic test plug 10 has an end cap structure 12 having threads 19 to mate with the threads 37 of the clean-out tee 36. The pneumatic test plug 10 may be designed for sealing a range of clean-out tee diameters, such as those ranging from two to six inches in diameter.

The test plug 10 is threaded into the clean-out tee 36 by means of turning stem 21. The test plug 10 has an inflatable elastomeric body 11 which extends into the pipeline or conduit 35 and which is inflated by means of inflator 22 to seal the pipeline 35. Clean-out tees 36 are typically found in drain pipes, such as those found in main plumbing drain pipes in residential structures, for example. However, the pneumatic test plug 10 of this invention is also useable in other horizontally or vertically disposed pipeline access ports which may require periodic entry for inspection or pressure testing purposes.

Figure 3:
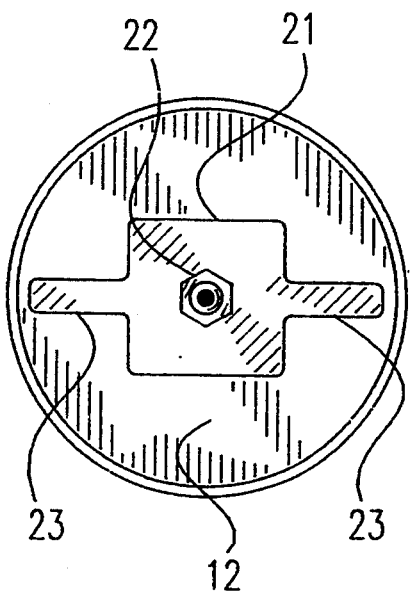
FIG. 3 is a bottom view of the pneumatic test plug of FIG. 2.

FIG. 2 shows the pneumatic test plug 10 having the elastomeric body 11 extending from the end cap structure 12. The elastomeric body 11 has a hemispherical top end 13 and an inwardly converging side wall 14 which terminates in the end cap 12, as will be further described. As also shown in FIG. 3, the molded end cap structure 12 has a turning stem 21 for receiving a wrench, and thumb wings 23, which permit hand tightening of the plug 10. A retention collar 24 is shown positioned on top of the external threaded portion 19 of end cap 12. An inflator 22 is shown positioned at the bottom of the end cap structure 12 and which communicates therethrough with the elastomeric body 11 for inflation and deflation of the test plug 10. Although the inflator 22 shown receives an air pressure source for inflation purposes, other pressurized fluids may also be utilized to inflate the elastomeric body 11. One of the opposing thumb wings 23 is shown to have an aperture 40 to receive a connector band 41 which holds a safety tag 38 through aperture 39. The safety tag 38 has operational instructions for the test plug 16 and has further warning statements regarding the proper use and operation of the test plug 10.

Figure 4:
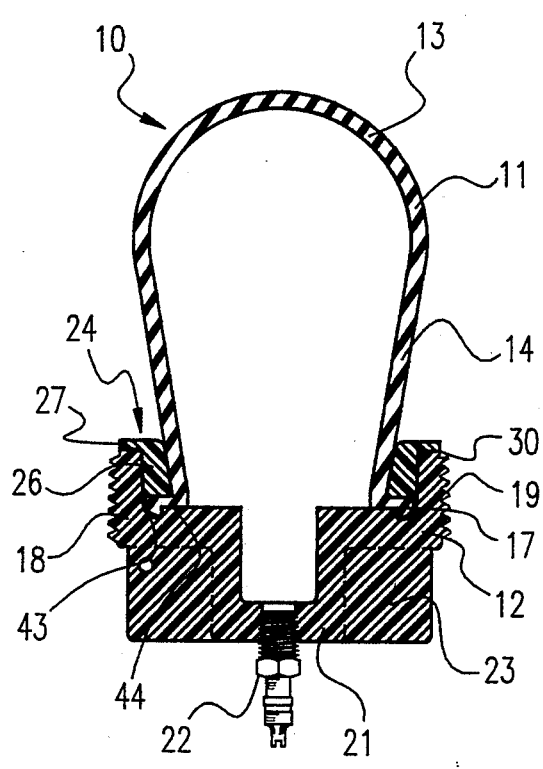
FIG. 4 is a lateral sectional view of the pneumatic test plug of FIG. 3.

As further shown in FIG. 4, the molded end cap 12 has a cylindrical wall 18 with exterior threads 19. A circular retention channel or area 20 is internally provided to receive the bottom end 15 of the elastomeric body 11. A retention collar 24 which is secured within the retention channel 20 holds and secures the elastomeric body 11 compressingly within the molded end cap 12. The retention collar 24 may be secured to the top portion of the cylindrical wall 18 by means of a solvent cement 30 or by other means as will be further discussed below.

Figure 5:
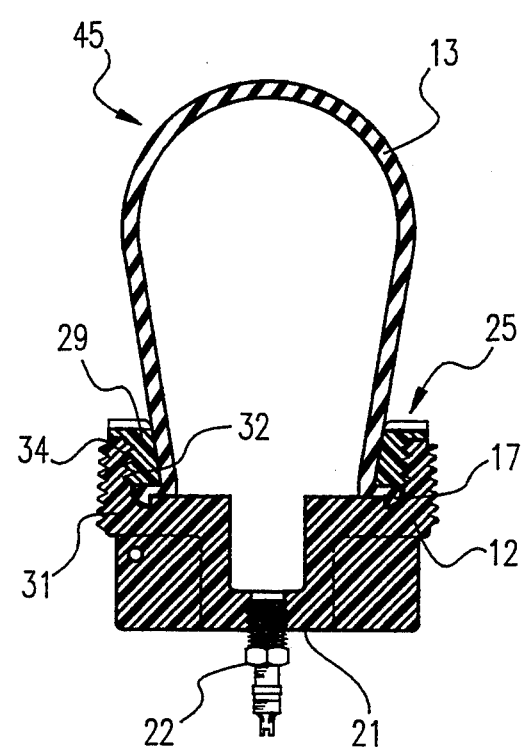
FIG. 5 is a lateral sectional view of another embodiment of the pneumatic test plug.
Figure 6:
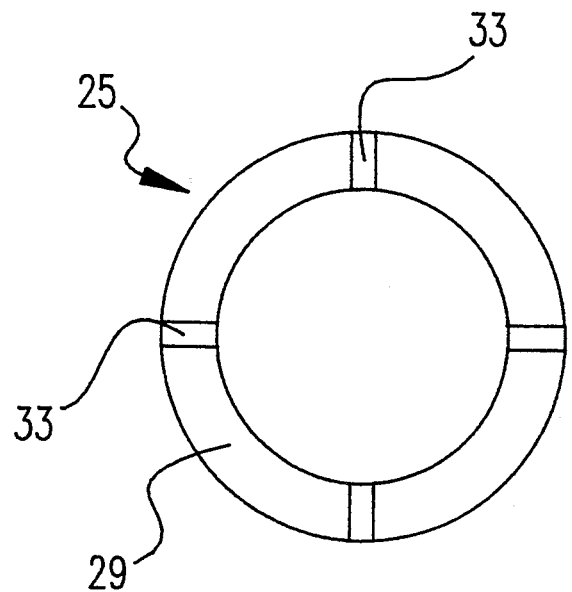
FIGS. 6 and 7 are top and sectional views, respectively, of the retention collar used in the test plug embodiment of FIG. 5.
Figure 7:
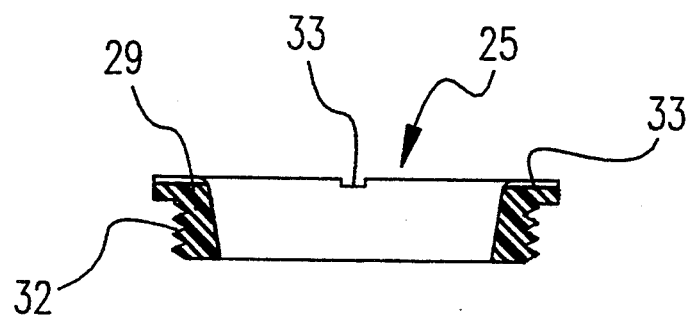

FIG. 5 shows another embodiment 45 of the pneumatic test plug. The test plug 45 is generally similar in structure as described with respect to that of FIGS. 2 and 4, except for the retention collar 25. As shown, the end cap 12 has an internally threaded wall 31 whereby the threads 34 matingly receive the threads 32 of the retention collar body 29. As further shown in FIGS. 6 and 7, the top of retention collar 25 has a plurality of slots 33 in body 29 and which are designed to receive a spanner wrench. Thus, the retention collar 25 may be tightened within retention channel of the end cap 12 to compressingly hold the bottom end 15 of the elastomeric body 11.

Figure 8:
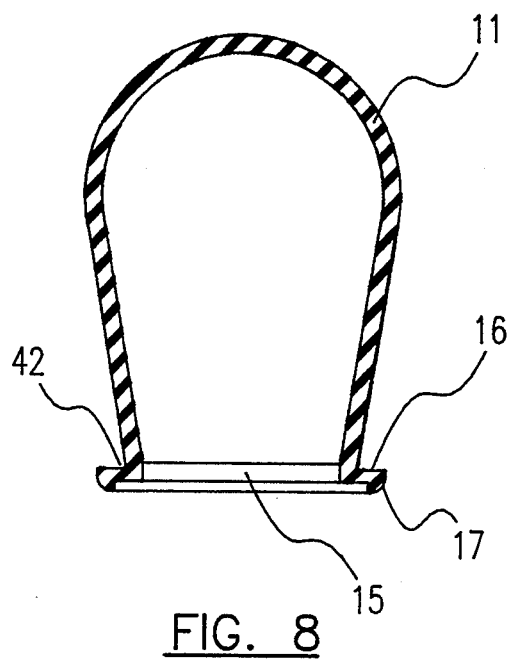
FIG. 8 is a lateral sectional view of the elastomeric body of the pneumatic test plug of this invention.
Figure 9:
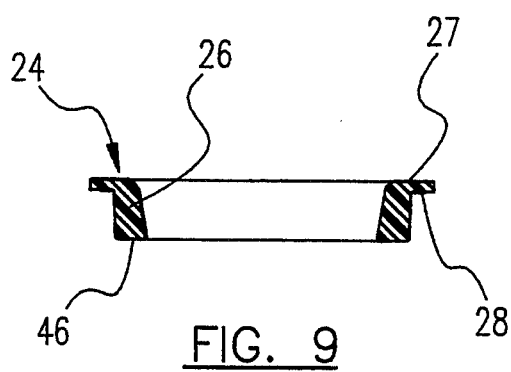
FIGS. 9 and 10 are sectional views showing the retention collar used in the test plug embodiment of FIG 2.
Figure 10:
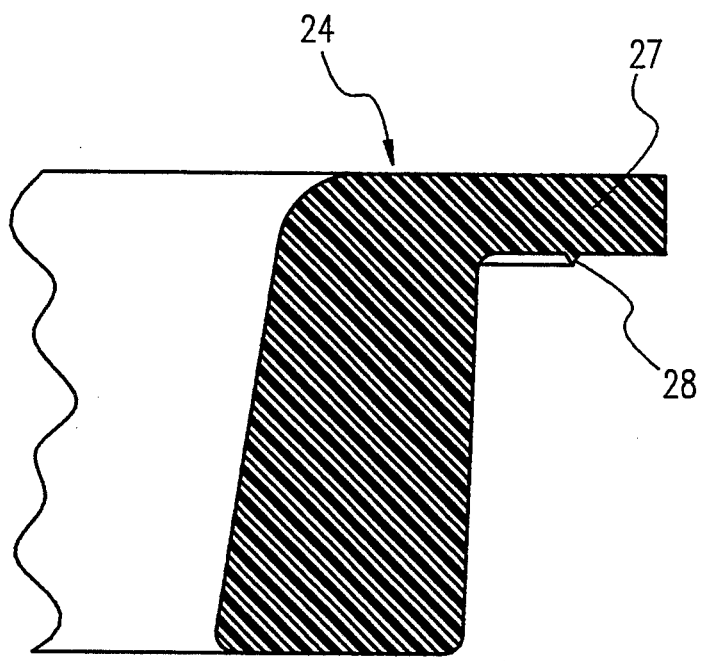

Important to this invention is the retention of the elastomeric body 11 within the molded end cap 12. As shown in FIGS. 8-10, the elastomeric body 11 has at its open bottom end 15 a peripheral, circumferential shoulder 16 with a downwardly extending peripheral ridge 17. The retention collar 24 shown in FIG. 9 has a tapered body 26 with a peripheral outer lip 27 and a bottom surface 46. Further, a circular protrusion 28 extends from the bottom surface of the outer lip 27 and which is shown in FIG. 10. In this preferred embodiment, the protrusion 28 is designed for ultrasonic welding purposes whereby the material making up the protrusion 28 functions as a weld line to fuse the outer lip 27 of the retention collar 24 to the top surface of the cylindrical wall 18 of the end cap 12. The ultrasonic welding process is comprised of directing a ultrasonic energy source above the peripheral outer lip 27 of the retention collar 24. The material which makes up the protrusion 28 is, thereby, initially melted which acts as a starting point to promote the fusion or melting of the entire horizontal surface, and which subsequently solidifies to unite the retention collar 24 to the top of the wall structure 31 of the end cap 12. To further promote the fusion between the end cap 12 and the retention collar 24, the top surface of the end cap 12 preferably has a roughness of approximately 125 to 250 microinches to facilitate the ultrasonic welding process.

As shown in FIG. 8, area 42 of the peripheral shoulder 16 is compressed by bottom surface 46 of the retention collar 24. Preferably, area 42 is compressed between 25 to 35% of its original thickness by either the retention collar 24 or 25. As shown further in FIGS. 4 and 5, the bottom surface of the retention collar has a wider dimension than the internal groove 43 of the circular retention channel 20. Thus, the downwardly extending peripheral ridge 17 of the peripheral shoulder 16 is securely held within the internal groove 43 as the retention collar 24 or 25 is fixed with respect to the end cap 12. The compression ledge 44 located adjacent the internal groove 43 also aids in compressingly receiving the open bottom end 15 of the elastomeric body 11.

The elastomeric body 11 is preferably molded of a flexible expansible material such as natural rubber, synthetic rubber or similar elastomeric materials. The elastomeric material used to mold the body 11 preferably has a durometer reading range of 50-60 Shore A, an elongation at break of 400-500%, a minimum tensile strength of 2000 psi and a minimum tear strength of 200 ppi. The end cap 12 is preferably molded of a plastic material, as are the retention collars. The end cap 12 and the retention collar 24 are preferably made of plastic suitable for ultrasonic welding which is heat stable and which also has a minimum tensile strength of 4000 psi.

The pneumatic test plug 10 of this invention provides an effective structure which lends itself to an efficient assembly process. The method of assembly comprises the steps of first placing the retention collar 24 or 25 about the open bottom end 15 of the elastomeric body 11. Next, the retention collar is inserted into the end cap 12 whereby the peripheral shoulder 16 and peripheral ridge 17 are positioned into the circular retention channel 20 of the end cap 12. Next, the retention collar 24 or 25 is forced downward against the peripheral shoulder 16 of the inflatable body 11 and compressed, preferably, between 25 to 35% its uncompressed thickness. Finally, the retention collar 24 or 25 is secured to the end cap. The latter securement may be accomplished by either utilizing an ultrasonic energy source to mate the retention collar to the end cap, by threading the retention collar into the interiorly threaded cylindrical wall 18 of the end cap 12, or by utilizing a solvent cement to fuse the retention collar in the end cap. The important aspect of the securement step being that the peripheral shoulder 16 and the downwardly extending peripheral ridge be compressingly held within the retention channel 20 and internal groove 43 of the end cap 12.

As many changes are possible to the embodiments of this invention utilizing the teachings thereof, the descriptions above, and the accompanying drawings should be interpreted in the illustrative and not the limited sense.

That which is claimed:

1. A pneumatic test plug for clean-out tees comprising:
   a) an elastomeric semirigid inflatable body having a closed top, an inwardly converging side wall and an open bottom end having a peripheral shoulder extending therefrom, said peripheral shoulder further having a downwardly extending peripheral ridge, b) a molded end cap structure having a cylindrical wall with exteriorly disposed threads and an inwardly disposed circular retention area adjacent said cylindrical wall, said retention area further having a circular groove of a predetermined width to receive said peripheral ridge of said inflatable body shoulder, said end cap structure further having inflation and deflation means, and c) a retention collar having a bottom surface with a width larger than the width of said groove for placement within said molded end cap and being for positioning between said cylindrical wall and said inflatable body bottom end, said collar fixing said peripheral shoulder and said downwardly extending peripheral ridge in said circular retention area and said circular groove of said end cap and compressing said peripheral shoulder and ridge of said inflatable body into said end cap.

2. The pneumatic test plug of claim 1, wherein said retention collar has a tapered cylindrical body and an upper peripheral outer lip with a bottom peripheral ridge to facilitate ultrasonic welding to said end cap.

3. The pneumatic test plug of claim 1, wherein said retention collar has a threaded exterior and wherein said cylindrical wall of said end cap has a threaded inner wall mating with said retention collar threads.

4. The pneumatic test plug of claim 1, wherein said end cap has a turning stem and wherein said inflation and deflation means is comprised of an inflator fixed in said end cap and communicating with said inflatable body.

5. The pneumatic test plug of claim 4, wherein said end cap is formed of a unitary, molded structure and further has opposing thumb wings extending from said turning stem.

6. The pneumatic test plug of claim 1, wherein said peripheral shoulder of said inflatable body is compressed between 25 to 35% by said retention collar.

7. The pneumatic test plug of claim 1, wherein said retention collar is secured within said end cap by means of a solvent cement.

8. The pneumatic test plug of claim 1, wherein said elastomeric inflatable body is molded of a material having a durometer reading of 50 to 60 Shore A, an elongation at break between 400 and 500% and a minimum tensile strength of 2000 psi.

9. A pneumatic test plug for clean-out tees comprising:

a) an elastomeric inflatable body having a hemispherical closed top, an inwardly converging side wall and an open bottom end having a peripheral shoulder extending therefrom, said peripheral shoulder further having a downwardly extending peripheral ridge, b) a molded end cap having a cylindrical wall with exteriorly disposed threads, said end cap having a cavity and a bottom surface within said cylindrical wall and an inwardly disposed circular retention area having a peripheral groove with a predetermined width in said bottom surface, said end cap further having an inflator fixed therein communicating with said cavity of said inflatable body, and c) a retention collar constructed and arranged for placement within said molded end cap and between said cylindrical wall and said inflatable body bottom end, said retention collar having a bottom surface with a width greater then the predetermined width of said peripheral groove of said retention area, said retention collar compressingly fixing said peripheral shoulder to said cavity bottom surface and said downwardly extending peripheral ridge in said peripheral groove of said circular retention area of said end cap.

10. The pneumatic test plug of claim 9, wherein said retention collar has a tapered cylindrical body and an upper peripheral outer lip with a bottom peripheral ridge to facilitate ultrasonic welding to said molded end cap.

11. The pneumatic test plug of claim 9 wherein said retention collar has a threaded exterior and wherein said cylindrical wall of said end cap has a threaded inner wall mating with said retention collar threads.

12. The pneumatic test plug of claim 9 wherein said molded end cap further has a turning stem and opposing thumb wings extending from said turning stem.

13. The pneumatic test plug of claim 9 wherein said peripheral shoulder of said inflatable body is compressed between 25 to 35% by said retention collar.

14. The pneumatic test plug of claim 9 wherein said retention collar is secured within said end cap by means of a solvent cement.

15. The pneumatic test plug of claim 9 wherein said elastomeric inflatable body is molded of a material having a durometer reading of 50 to 60 Shore A, an elongation at break between 400 and 500% and a minimum tensile strength of 2000 psi.

16. An improved pneumatic test plug for clean-out tees comprising:

a) an elastomeric inflatable body having an inwardly converging side wall and an open bottom end having a peripheral shoulder extending outwardly from said side wall at said bottom end, said inflatable body further having a downwardly extending ridge at the end of said outwardly extending peripheral shoulder, b) a molded end cap structure having an upwardly extending cylindrical wall and an interiorly disposed bottom surface defining a cavity in said end cap structure, said cavity further having a circular groove to capture said downwardly extending ridge of said inflatable body, said end cap structure further having inflation and deflation means operative through said bottom surface of said end cap structure cavity, and c) a tapered retention collar structure constructed and arranged for mounting in said end cap cavity and for positioning about said inflatable body bottom end, said retention collar further having a bottom surface for compressingly fixing said inflatable body peripheral shoulder against said cavity bottom surface and said downwardly extending ridge into said groove.

17. The pneumatic plug of claim 16, wherein said end cap has a turning stem and wherein said inflation and deflation means is comprised of an inflator fixed in said end cap and communicating with said inflatable body.

18. The pneumatic plug of claim 17, wherein said end cap is formed of a unitary, molded structure and further has opposing thumb wings extending from said turning stem.

19. The pneumatic plug of claim 18, wherein said peripheral shoulder of said inflatable body is compressed between 25 and 35% by said tapered retention collar and said elastomeric inflatable body is molded of a material having a durometer reading of 50 to 60 Shore A, an elongation at break between 400 and 500% and a minimum tensile strength of 2000psi.

* * * * *